(12) United States Patent
Tu et al.

(10) Patent No.: US 12,459,375 B2
(45) Date of Patent: Nov. 4, 2025

(54) OPTIMIZED ENERGY ALLOCATION METHOD AND SYSTEM FOR ELECTRIC VEHICLE AND ELECTRIC VEHICLE

(71) Applicant: Xiamen Yaxon Zhilian Technology Co., Ltd., Fujian (CN)

(72) Inventors: Yankai Tu, Fujian (CN); Xuhui Ye, Fujian (CN)

(73) Assignee: Xiamen Yaxon Zhilian Technology Co., Ltd., Fujian (CN)

( * ) Notice: Subject to any disclaimer, the term of this patent is extended or adjusted under 35 U.S.C. 154(b) by 343 days.

(21) Appl. No.: 18/041,119

(22) PCT Filed: Jul. 29, 2021

(86) PCT No.: PCT/CN2021/109151
§ 371 (c)(1),
(2) Date: Feb. 9, 2023

(87) PCT Pub. No.: WO2022/037380
PCT Pub. Date: Feb. 24, 2022

(65) Prior Publication Data
US 2023/0264575 A1    Aug. 24, 2023

(30) Foreign Application Priority Data

Aug. 18, 2020   (CN) .......................... 202010831300.X

(51) Int. Cl.
*B60L 15/20*        (2006.01)
*B60L 3/12*         (2006.01)
(Continued)

(52) U.S. Cl.
CPC ............. *B60L 15/2045* (2013.01); *B60L 3/12* (2013.01); *B60L 7/10* (2013.01); *B60L 50/40* (2019.02);
(Continued)

(58) Field of Classification Search
CPC ............. B60L 15/2009; B60L 15/2018; B60L 15/2045; B60L 2220/42; B60L 2240/26;
(Continued)

(56) References Cited

U.S. PATENT DOCUMENTS

| | | | |
|---|---|---|---|
| 6,054,776 A * | 4/2000 | Sumi ....................... | B60K 6/48 |
| | | | 290/40 C |
| 7,096,985 B2 * | 8/2006 | Charaudeau .............. | B60L 7/14 |
| | | | 180/65.245 |

(Continued)

FOREIGN PATENT DOCUMENTS

| | | | | |
|---|---|---|---|---|
| CN | 101559726 B | * | 10/2011 | .............. B60L 50/16 |
| CN | 103552477 A | | 2/2014 | |

(Continued)

OTHER PUBLICATIONS

International Search Report cited in PCT/CN2021/109151 mailed Oct. 28, 2021, 5 pages.

(Continued)

*Primary Examiner* — Babar Sarwar
(74) *Attorney, Agent, or Firm* — Cooper Legal Group, LLC

(57) ABSTRACT

The present invention discloses an optimized energy allocation method and system for an electric vehicle and an electric vehicle. The method includes step (1) detecting remaining charge levels of a first super-capacitor and a second super-capacitor, determining whether the remaining charge levels of the first super-capacitor and the second super-capacitor are greater than a preset threshold value, and if so, proceeding to step (2); step (2) acquiring a topographic map of a road ahead by means of an electric horizon system, predicting whether there is a continuous slope ahead, and if so, proceeding to step (3); and step (3) according to a continuous slope value ahead, predicting a braking force allocation proportion when carrying out braking ahead, (Continued)

allocating current power outputs of the first super-capacitor and the second super-capacitor in advance according to the braking force allocation proportion, and returning to step (1).

8 Claims, 1 Drawing Sheet

(51) Int. Cl.
  *B60L 7/10* (2006.01)
  *B60L 50/40* (2019.01)
  *B60L 50/50* (2019.01)
  *B60T 8/24* (2006.01)
(52) U.S. Cl.
  CPC ............... B60L 50/50 (2019.02); B60T 8/24 (2013.01); *B60L 2240/42* (2013.01)
(58) Field of Classification Search
  CPC .......... B60L 2240/42; B60L 2240/423; B60L 2240/622; B60L 2240/642; B60L 2260/28; B60L 3/12; B60L 50/40; B60L 50/50; B60L 58/20; B60L 7/10; B60T 13/74; B60T 8/24; Y02T 10/70; Y02T 10/72
  See application file for complete search history.

(56) References Cited

U.S. PATENT DOCUMENTS

| | | | | |
|---|---|---|---|---|
| 9,855,851 B2 * | 1/2018 | Blum | ................ | B60L 53/12 |
| 10,077,752 B1 * | 9/2018 | Lee | ................ | H02J 7/1423 |
| 11,833,928 B2 * | 12/2023 | Miller | ................ | B60L 58/12 |
| 12,151,566 B2 * | 11/2024 | Ashton | ................ | B60L 50/62 |
| 2008/0142282 A1 * | 6/2008 | Bartilson | ................ | B60K 6/46 903/905 |
| 2012/0074960 A1 * | 3/2012 | Minarcin | ................ | B60L 58/12 324/658 |
| 2015/0283911 A1 * | 10/2015 | Ambrosio | ................ | B60L 50/40 307/10.1 |
| 2016/0318501 A1 * | 11/2016 | Oldridge | ................ | B60W 20/12 |
| 2019/0126759 A1 * | 5/2019 | Miller | ................ | B60L 7/18 |

FOREIGN PATENT DOCUMENTS

| | | | | | |
|---|---|---|---|---|---|
| CN | 106080223 A | | 11/2016 | | |
| CN | 107471995 A | | 12/2017 | | |
| CN | 107878225 A | * | 4/2018 | ............. | B60L 58/10 |
| CN | 107985092 A | * | 5/2018 | ............. | B60L 53/00 |
| CN | 213292005 U | * | 5/2021 | | |
| CN | 106696721 B | * | 7/2023 | ............. | B60L 50/52 |
| CN | 114174104 B | * | 1/2025 | ............. | F03G 3/08 |
| DE | 10205555 B4 | * | 6/2007 | ............. | B60L 50/40 |
| JP | 4123691 B2 | * | 7/2008 | | |
| WO | WO-2007055266 A1 | * | 5/2007 | ............. | B60L 53/11 |
| WO | WO-2010144042 A1 | * | 12/2010 | ............. | B60L 58/12 |

OTHER PUBLICATIONS

Written Opinion cited in PCT/CN2021/109151 mailed Oct. 28, 2021, 3 pages.

* cited by examiner

OPTIMIZED ENERGY ALLOCATION METHOD AND SYSTEM FOR ELECTRIC VEHICLE AND ELECTRIC VEHICLE

TECHNICAL FIELD

The present invention relates to the field of electric vehicles, in particular to an optimized energy allocation method and system for an electric vehicle and an electric vehicle.

BACKGROUND

The working efficiency of a whole vehicle can be improved by means of a dual-motor driving technology, and thus the endurance mileage can be increased. At present, the main dual-motor driving technology adopts a power division manner, one motor is responsible for front driving, and the other motor is responsible for rear driving. An efficient working area can be reused in such manner of dual-motor driving, and although the two motors are used, generally, there is still only one energy system such as a battery and a super-capacitor, that is, the same energy system supplies power to the two motors at the same time.

For such B+C type composite power supply system using the battery and the super-capacitor, the super-capacitor is added in addition to the battery, thus the characteristics of high energy recovery efficiency and applicability to large-current output of the super-capacitor can be implemented, and the super-capacitor is an effective supplement to a single-battery system and can mitigate aging and attenuation caused by over-discharge or over-charge of the battery.

In existing common B+C energy allocation strategies, under the same power demand, power output by the super-capacitor to front and rear wheels is identical or in a fixed ratio, which does not consider the difference of recovered energy amounts of the front and rear wheels in different terrains, so that the energy output of the super-capacitor is not correspondingly controlled according to the difference of the energy that may be recovered by the front and rear wheels in the terrains, and it is impossible to optimize the energy storage space during energy recovery and maximize the energy recovery.

SUMMARY

In order to solve the technical problems in the prior art, the present invention provides an optimized energy allocation method and system for an electric vehicle and an electric vehicle, which increases the total capacity of super-capacitors and increases recovered braking or sliding energy.

The technical solutions used in the present invention to solve the technical problems are as follows: the optimized energy allocation method for the electric vehicle includes setting a first super-capacitor and a second super-capacitor on the basis that a battery supplies power for or recovers power from a front wheel driving device and/or a rear wheel driving device, wherein the first super-capacitor is used to supply power for or recover power from the rear wheel driving device of the electric vehicle, and the second super-capacitor is used to supply power for or recover power from the front wheel driving device of the electric vehicle; the rear wheel driving device comprises a first differential mechanism and a first motor and is used to drive rear wheels, the front wheel driving device comprises a second differential mechanism and a second motor and is used to drive front wheels, and the optimized energy allocation method comprises steps of:

s11, detecting, by an energy control device, remaining charge levels of the first super-capacitor and the second super-capacitor;

s12, determining, by the energy control device, whether the remaining charge levels of the first super-capacitor and the second super-capacitor are greater than a preset threshold value, when the remaining charge levels of the first super-capacitor and the second super-capacitor are greater than the preset threshold value, proceeding to step s21, otherwise, repeating the step s11;

s21, acquiring, by means of an electric horizon system, a topographic map of a road ahead of a position where the electric vehicle is located;

s22, predicting whether there is a continuous slope on the road ahead of the position where the electric vehicle is located, when there is the continuous slope on the road ahead of the position where the electric vehicle is located, proceeding to step s31, otherwise, returning to the step s11;

s31, predicting, by the energy control device, an allocation proportion of braking forces of the front wheels and the rear wheels when the electric vehicle is braked at a continuous slope position of the road ahead, according to a continuous slope value of the road ahead of the position where the electric vehicle is located; and s32, allocating a proportion of current power outputs of the first super-capacitor and the second super-capacitor in advance according to the allocation proportion of the braking forces of the front wheels and the rear wheels, and returning to the step s11.

As a preferred solution of the present invention, in the step s31, an allocation relationship of the braking forces of the front and rear wheels when braking is carried out at the continuous slope position of the road ahead is predicted firstly according to the continuous slope value of the road ahead, and then the allocation proportion of the braking forces is calculated according to the allocation relationship of the braking forces of the front and rear wheels.

As a preferred solution of the present invention, the allocation relationship of the braking forces of the front and rear wheels is as follows:

$$\begin{cases} F_f = \dfrac{G}{L}(L_b\cos\theta + zh_g - h_g\sin\theta) \\ F_j = \dfrac{G}{L}(L_a\cos\theta - zh_g + h_g\sin\theta) \end{cases}$$

$F_f$ and $F_r$ respectively represent normal action forces borne by the front and rear wheels; G represents the gravity of the electric vehicle; $L_a$ and $L_b$ respectively represent distances from the center of mass of the electric vehicle to front and rear axles; L represents the wheelbase of the electric vehicle; $h_g$ represents the height of the center of mass of the electric vehicle; z represents the braking strength and is a product of the deceleration caused by braking of the electric vehicle and the mass of the electric vehicle; and θ represents the continuous slope value.

As a preferred solution of the present invention, the allocation proportion of the braking forces of the front and rear wheels is as follows:

$$b_1 = \frac{F_{bf}}{F_{br}} = \frac{F_f}{F_r} = \frac{L_b\cos\theta + zh_g - h_g\sin\theta}{L_b\cos\theta - zh_g + h_g\sin\theta}$$

where $F_{bf}$ and $F_{br}$ respectively represent the braking forces borne by the front and rear wheels.

As a preferred solution of the present invention, in the step s32, said allocating the current power outputs of the first super-capacitor and the second super-capacitor in advance according to the allocation proportion of the braking forces of the front and rear wheels specifically includes: the power output of the first super-capacitor is $P_{c1}=P_c*b_1$, and the power output of the second super-capacitor is $P_{c2}=1-P_{c1}$, wherein $P_c$ represents the total power output demand of the super-capacitors, $$P_{c1} = \frac{L_b\cos\theta - zh_g + h_g\sin\theta}{L_a\cos\theta + L_b\sin\theta}P_c,$$

and $P_{c2}=1-P_{c1}$.

As a preferred solution of the present invention, in the step s22, if there is no continuous slope terrain on the road ahead, a conventional dual-motor energy allocation strategy is adopted, and then the operation returns to the step s11.

The optimized energy allocation system for the electric vehicle includes a battery, a front wheel driving device and a rear wheel driving device, wherein the battery supplies power for or recovers power from the front wheel driving device and/or the rear wheel driving device of the electric vehicle; the optimized energy allocation system further includes a first super-capacitor, a second super-capacitor and an energy control device; the energy control device is connected to an electric horizon system, the battery, the first super-capacitor and the second super-capacitor; and a proportion of current power outputs of the first super-capacitor and the second super-capacitor is allocated by means of the above-mentioned optimized energy allocation method for the electric vehicle.

The dual-motor-driven electric vehicle includes a vehicle body and further includes the above-mentioned optimized energy allocation system for the electric vehicle.

By means of the above technical solutions, compared with the prior art, the present invention has the following beneficial effects:

1. in the present invention, for the dual-motor electric vehicle, the two super-capacitors are used to recover the energy outputs of the front and rear wheels separately, thus the total capacity of the super-capacitors is increased; and under the prediction on the basis of the electric horizon system, different allocation proportions of the energy outputs of the super-capacitors are formulated according to the mechanical properties of the front and rear wheels in different terrain environments, thereby ensuring that reasonable electric energy storage spaces can be cleared after the predicted terrain is reached, recovering the braking or sliding energy as much as possible and achieving the more ideal economic effect; and 2. in the present invention, the allocation relationship of the braking forces of the front and rear wheels when braking is carried out ahead is predicted firstly according to the continuous slope value ahead, then the allocation proportion of the braking forces is calculated according to the allocation relationship of the braking forces of the front and rear wheels and is used as the allocation basis for the power outputs of the first super-capacitor and the second super-capacitor, thus the proportion of the cleared storage spaces of the super-capacitors of the front and rear wheels is identical with the proportion of the energy recovered by braking after the terrain ahead is reached, and waste after the recovered electric energy is generated by the braking forces can be avoided.

Figure 1:
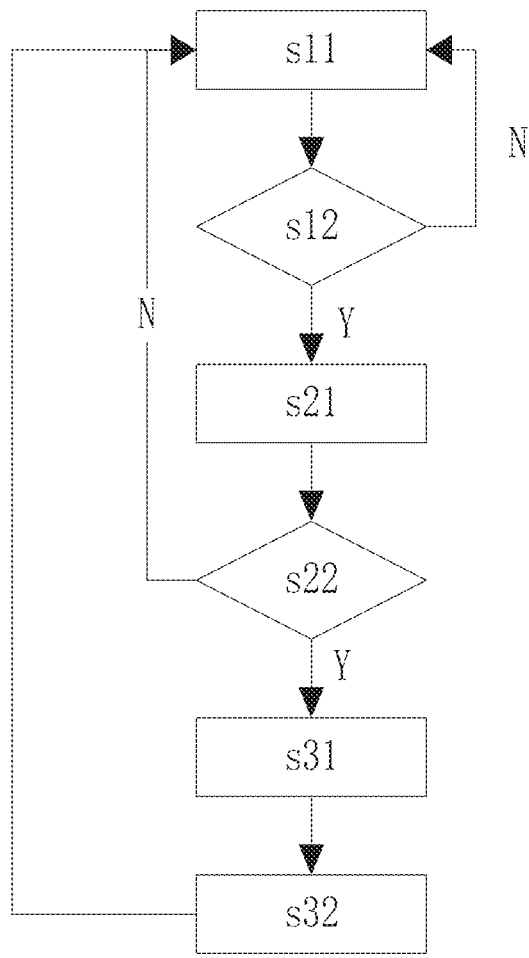
FIG. 1 is a flow chart of a method of the present invention.

In the drawings, 10. battery, 20. first differential mechanism, 30. first motor, 40. first super-capacitor, 50. second differential mechanism, 60. second motor, 70. second super-capacitor, 80. energy control device, and 90. electric horizon system.

DESCRIPTION OF EMBODIMENTS

The technical solutions of the present invention are described in detail below in conjunction with the accompanying drawings and embodiments.

Embodiments

Figure 2:
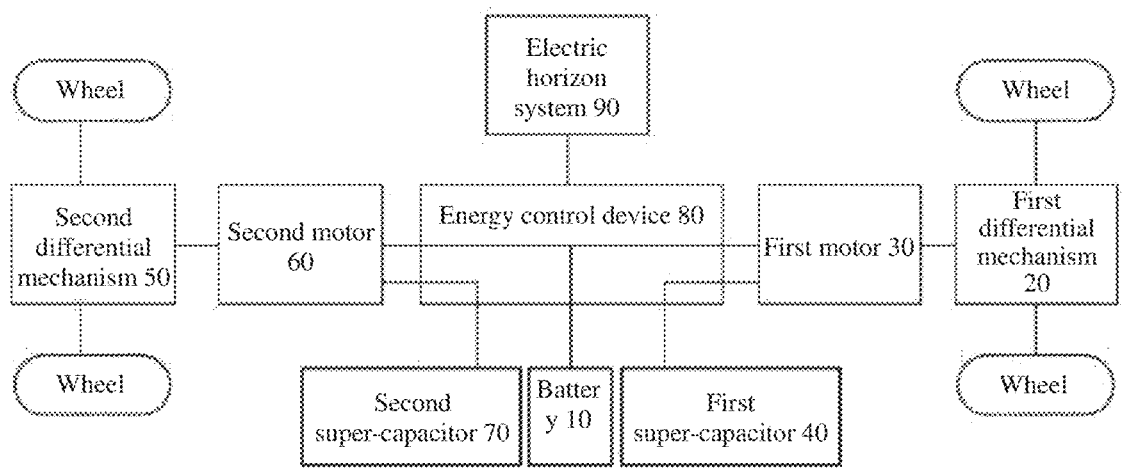
FIG. 2 is a structure diagram of a system of the present invention.

Referring to FIG. 1 and FIG. 2, an optimized energy allocation method for an electric vehicle includes setting a first super-capacitor 40 and a second super-capacitor 70 on the basis that a battery supplies power for or recovers power from a front wheel driving device and/or a rear wheel driving device, wherein the first super-capacitor 40 is used to supply power for or recover power from the rear wheel driving device of the electric vehicle, and the second super-capacitor 70 is used to supply power for or recover power from the front wheel driving device of the electric vehicle; and the specific allocation method includes the steps of:

step s11, detecting, by an energy control device, remaining charge levels of the first super-capacitor 40 and the second super-capacitor 70;

step s12, determining, by the energy control device, whether the remaining charge levels, that is, SOC values of the first super-capacitor 40 and the second super-capacitor 70 are greater than a preset threshold value, if so, consider clearing storage spaces as much as possible for braking energy that may be recovered in the future, proceed to step s21, otherwise, repeat the step s11.

step 21, acquiring, by means of an electric horizon system 90, a topographic map of a road ahead of the position where the electric vehicle is located;

step s22, predicting whether there is a continuous slope on the road ahead of the position where the electric vehicle is located, if so, acquire a continuous slope value, proceed to step s31 to optimize an energy allocation strategy in a predictive manner, otherwise, return to the step s11.

In this step, if there is no continuous stable terrain on the road ahead, a conventional energy allocation strategy is implemented, the conventional energy allocation strategy is a well-known dual-motor energy allocation strategy, for example, a B+C energy allocation strategy, under the same power demand, power output by the super-capacitors to front and rear wheels is identical or in a fixed ratio, and at this moment, the first super-capacitor 40 and the second super-capacitor 70 only play a simple role in increasing the capacity.

step s31, predicting an allocation proportion of braking forces of the front and rear wheels when the electric vehicle is braked at the continuous slope position of the road ahead, according to the continuous slope value of the road ahead of the position where the electric vehicle is located;

step s32, allocating the proportion of current power outputs of the first super-capacitor 40 and the second super-capacitor 70 in advance according to the allocation proportion of the braking forces, and return to the step s31.

In the step s31, an allocation relationship of the braking forces of the front and rear wheels when braking is carried out at the continuous slope position of the road ahead is predicted firstly according to the continuous slope value of the road ahead, and then the allocation proportion of the braking forces is calculated according to the allocation relationship of the braking forces of the front and rear wheels.

The allocation relationship of the braking forces of the front and rear wheels is as follows:

$$\begin{cases} F_f = \frac{G}{L}(L_b\cos\theta + zh_g - h_g\sin\theta) \\ F_r = \frac{G}{L}(L_a\cos\theta - zh_g + h_g\sin\theta) \end{cases}$$

$F_f$ and $F_r$ respectively represent normal action forces borne by the front and rear wheels; G represents the gravity of the electric vehicle; $L_a$ and $L_b$ respectively represent distances from the center of mass of the electric vehicle to front and rear axles; L represents the wheelbase of the electric vehicle; $h_g$ represents the height of the center of mass of the electric vehicle; z represents the braking strength and is a product of the deceleration caused by braking of the electric vehicle and the mass of the electric vehicle; and θ represents the continuous slope value.

According to the common general knowledge, when the braking forces acting on the front and rear wheels are directly proportional to the respective normal action forces $F_f$ and $F_r$, attachment conditions of the ground will be fully utilized, the braking efficiency of the electric vehicle is highest, and the stability is the best, so it can be predicted that when braking is needed at the continuous slope position on the road ahead, the allocation proportion of the braking forces of the front and rear wheels is as follows:

$$b_1 = \frac{F_{bf}}{F_{br}} = \frac{F_f}{F_r} = \frac{L_b\cos\theta + zh_g - h_g\sin\theta}{L_b\cos\theta - zh_g + h_g\sin\theta}$$

where $F_{bf}$ and $F_{br}$ respectively represent the braking forces borne by the front and rear wheels. It can be seen from the formula that the allocation proportion of the braking forces will change with the slope, when the downslope grade is higher, that is, θ<0, $$\frac{F_{bf}}{F_{br}} > 1,$$

and the braking force of the front wheel should be greater than that of the rear wheel; otherwise, when the upslope grade is higher, $$\frac{F_{bf}}{F_{br}} < 1,$$

and the braking force of the rear wheel should be greater than that of the front wheel.

The proportion of electric energy recovered during braking varies with the proportion of the braking forces. Therefore, according to the predicted braking proportion ahead, the current power outputs of the first super-capacitor 40 and the second super-capacitor 70 are appropriately allocated in advance. The proportion of the cleared storage spaces of the super-capacitors of the front and rear wheels is identical with the proportion of the energy recovered by braking after the terrain ahead is reached, thereby avoiding waste caused by the phenomenon that after the recovered electric energy is generated by the braking forces, the recovered energy of the front and rear wheels is different, the capacities of the super-capacitors mismatch and some super-capacitors are full and cannot recover the energy.

According to a traditional B+C composite power energy allocation method for the vehicle, the power output demand of the battery and the power output demands of the super-capacitors in the current required driving force of the vehicle can be obtained. Assuming the total power output demand of the super-capacitors, calculated according to the traditional energy allocation method, is $P_c$, the power output of the first super-capacitor 40 allocated to the rear wheel is $P_{c1}=P_c*b_1$, the power output of the second super-capacitor 70 allocated to the front wheel is $P_{c2}=1-P_{c1}$, $$P_{c1} = \frac{L_b\cos\theta - zh_g + h_g\sin\theta}{L_a\cos\theta + L_b\sin\theta}P_c,$$

and $P_{c2}=1-P_{c1}$.

Referring to FIG. 2, the present invention further provides an optimized energy allocation system for an electric vehicle, including a battery 10, a front wheel driving device, a rear wheel driving device, a first super-capacitor 40, a second super-capacitor 70 and an energy control device 80. The rear wheel driving device includes a first differential mechanism 20 and a first motor 30 and is used to drive the rear wheel. The front wheel driving device includes a second differential mechanism 50 and a second motor 60 and is used to drive the front wheel.

The battery 10 supplies power for or recovers power from the front wheel driving device and/or the rear wheel driving device, that is, the battery 10 can separately supply the power for the first motor 30 or the second motor 60, or can supply the power for the first motor 30 and the second motor 60 at the same time, and the power is converted by the motors into mechanical energy for vehicle driving; and the battery 10 can separately recover power converted from the mechanical energy during the braking or sliding period of the first motor 30 or the second motor 60, or can simultaneously recover power generated by the first motor 30 and the second motor 60.

The first super-capacitor 40 only supplies power for the first motor 30 or recovers the power of the first motor 30 in terms of physical connection, and the second super-capacitor 70 only supplies power for the second motor 60 or recovers the power of the second motor 60 in terms of physical connection. The energy control device 80 is connected to an electric horizon system 90, the battery 10, the first super-capacitor 40 and the second super-capacitor 70, and is used to allocate the power to the motors from the battery 10, the first super-capacitor 40 and the second super-capacitor 70 and allocate the recovered power from the motors to the battery 10, the first super-capacitor 40 and the second super-capacitor 70.

The system of the present invention allocates the proportion of the current power outputs of the first super-capacitor 40 and the second super-capacitor 70 by means of the above-mentioned optimized energy allocation method for the electric vehicle. According to road terrain slope information ahead provided by the electric horizon system 90, and in conjunction with road terrain slope information predicted ahead, the energy allocation strategy for the battery 10, the first super-capacitor 40 and the second super-capacitor 70 can be optimized, and the economy or the comfort level of the vehicle can be increased.

On this basis, the present invention further provides a dual-motor-driven electric vehicle, including a vehicle body and the above-mentioned optimized energy allocation system for the electric vehicle. Double super-capacitors are used, so that the electric energy storage capacity is increased, the energy output proportion of the super-capacitors of front and rear wheels can be optimized according to predicted terrain conditions ahead, it is ensured that reasonable electric energy storage spaces can be cleared after the predicted terrain is reached, energy can be recovered as much as possible, and the electric vehicle has more energy-saving advantages.

The foregoing are merely preferred embodiments of the present invention and are not intended to limit the present invention in any way. Although the present invention has been described with reference to the preferred embodiments, it is not intended to be limited thereto. Any person skilled in the art, without departing from the scope of the technical solutions of the present invention, may make many possible variations and modifications to the technical solutions of the present invention based on the technical content disclosed above, or modify it to equivalent embodiments. Therefore, any simple modifications, equivalent changes and modifications of the above embodiments in accordance with the technical substance of the present invention without departing from the technical solutions of the present invention shall fall within the scope of protection of the technical solutions of the present invention.

INDUSTRIAL APPLICABILITY

According to the optimized energy allocation method and system for the electric vehicle and the electric vehicle in the present invention, the continuous slope value of the road ahead is acquired by means of electric horizons, the allocation proportion of the braking forces of the front and rear wheels when the electric vehicle is braked at the continuous slope position of the road ahead is predicted according to the continuous slope value, and the proportion of the current power outputs of the first super-capacitor and the second super-capacitor is allocated in advance according to the allocation proportion of the braking forces of the front and rear wheels, thereby ensuring that the reasonable electric energy storage spaces can be cleared after the predicted terrain is reached, recovering the braking or sliding energy as much as possible and achieving the more ideal economic effect. The electric horizon system is a database system that can provide accurate real-time information about the road ahead for the vehicle, and various dynamic data, such as speed limiting information, traffic lights, construction sites and obstacles of the road ahead, and actual road data can be acquired by means of the electric horizon system. The present invention is easy to implement in industry by means of the electric horizon system and a vehicle-mounted device, and various components such as the battery, the first super-capacitor, the second super-capacitor, the first motor, the second motor, the first differential mechanism, the second differential mechanism and the energy control device are also easy to process in industry.

The invention claimed is:

1. An optimized energy allocation method for an electric vehicle, comprising: setting a first super-capacitor and a second super-capacitor on a basis that a battery supplies power for or recovers power from at least one of a front wheel driving device or a rear wheel driving device, wherein the first super-capacitor is used to supply power for or recover power from the rear wheel driving device of the electric vehicle, the second super-capacitor is used to supply power for or recover power from the front wheel driving device of the electric vehicle, the rear wheel driving device comprises a first differential mechanism and a first motor and is used to drive rear wheels, the front wheel driving device comprises a second differential mechanism and a second motor and is used to drive front wheels, and the optimized energy allocation method comprises steps of:

(s11), detecting, by an energy control device, remaining charge levels of the first super-capacitor and the second super-capacitor;

(s12), determining, by the energy control device, whether the remaining charge levels of the first super-capacitor and the second super-capacitor are greater than a preset threshold value, when the remaining charge levels of the first super-capacitor and the second super-capacitor are greater than the preset threshold value, proceeding to step (s21), otherwise, repeating the step (s11);

the step (s21), acquiring, by means of an electric horizon system, a topographic map of a road ahead of a position where the electric vehicle is located;

(s22), predicting whether there is a continuous slope on the road ahead of the position where the electric vehicle is located, when there is the continuous slope on the road ahead of the position where the electric vehicle is located, proceeding to step (s31), otherwise, returning to the step (s11);

the step (s31), predicting, by the energy control device, an allocation proportion of braking forces of the front wheels and the rear wheels when the electric vehicle is braked at a continuous slope position of the road ahead, according to a continuous slope value of the road ahead of the position where the electric vehicle is located; and (s32), allocating a proportion of current power outputs of the first super-capacitor and the second super-capacitor in advance according to the allocation proportion of the braking forces of the front wheels and the rear wheels, and returning to the step (s11).

2. The optimized energy allocation method according to claim 1, wherein in the step (s31), an allocation relationship of the braking forces of the front wheels and the rear wheels when braking is carried out at the continuous slope position of the road ahead is predicted firstly according to the continuous slope value of the road ahead, and then the allocation proportion of the braking forces is calculated according to the allocation relationship of the braking forces of the front wheels and the rear wheels.

3. The optimized energy allocation method according to claim 2, wherein the allocation relationship of the braking forces of the front wheels and the rear wheels comprises:

$$\begin{cases} F_f = \dfrac{G}{L}(L_b\cos\theta + zh_g - h_g\sin\theta) \\ F_r = \dfrac{G}{L}(L_a\cos\theta - zh_g + h_g\sin\theta) \end{cases}$$

$F_f$ and $F_r$ respectively represent normal action forces borne by the front wheels and the rear wheels; G represents gravity of the electric vehicle; $L_a$ and $L_b$ respectively represent distances from a center of mass of the electric vehicle to a front axle and a rear axle; L represents a wheelbase of the electric vehicle; $h_g$ represents a height of the center of mass of the electric vehicle; z represents braking strength and is a product of deceleration caused by braking of the electric vehicle and a mass of the electric vehicle; and θ represents the continuous slope value.

4. The optimized energy allocation method according to claim 3, wherein the allocation proportion of the braking forces of the front wheels and the rear wheels is as follows:

$$b_1 = \frac{F_{bf}}{F_{br}} = \frac{F_f}{F_r} = \frac{L_b\cos\theta + zh_g - h_g\sin\theta}{L_b\cos\theta - zh_g + h_g\sin\theta}$$

wherein $F_{bf}$ and $F_{br}$ respectively represent the braking forces borne by the front wheels and the rear wheels.

5. The optimized energy allocation method according to claim 4, wherein in the step (s32), the allocating the proportion of current power outputs of the first super-capacitor and the second super-capacitor in advance according to the allocation proportion of the braking forces of the front wheels and the rear wheels specifically comprises: the power output of the first super-capacitor is $P_{c1}=P_c*b_1$, and the power output of the second super-capacitor is, $P_{c2}=1-P_{c1}$, wherein $P_c$ represents a total power output demand of the first super-capacitor and the second super-capacitor, $$P_{c1} = \frac{L_b\cos\theta - zh_g + h_g\sin\theta}{L_a\cos\theta + L_b\sin\theta}P_c,$$

and $P_{c2}=1-P_{c1}$.

6. The optimized energy allocation method according to claim 1, wherein in the step (s22), when there is no continuous slope terrain on the road ahead, a conventional dual-motor energy allocation strategy is adopted, and then the operation returns to the step (s11).

7. An optimized energy allocation system for an electric vehicle, comprising the battery, the front wheel driving device and the rear wheel driving device, wherein the battery supplies power for or recovers power from at least one of the front wheel driving device or the rear wheel driving device of the electric vehicle; the optimized energy allocation system further comprises the first super-capacitor, the second super-capacitor and the energy control device; the energy control device is connected to the electric horizon system, the battery, the first super-capacitor and the second super-capacitor; and the proportion of current power outputs of the first super-capacitor and the second super-capacitor is allocated by means of the optimized energy allocation method according to claim 1.

8. A dual-motor-driven electric vehicle comprising a vehicle body, wherein the electric vehicle further comprises the optimized energy allocation system according to claim 7.

* * * * *